US006812591B2

(12) United States Patent
Umemura et al.

(10) Patent No.: US 6,812,591 B2
(45) Date of Patent: Nov. 2, 2004

(54) POWER CONTROL DEVICE WITH ELECTRIC DOUBLE LAYER CAPACITOR UNIT CELLS (75) Inventors: Tokihiro Umemura, Mie (JP); Noriko Kawakami, Tokyo (JP); Tomotsugu Ishizuka, Tokyo (JP); Kazuhiro Nakajima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 463 days.

(21) Appl. No.: 09/903,678

(22) Filed: Jul. 13, 2001

(65) Prior Publication Data

US 2002/0017822 A1 Feb. 14, 2002

(30) Foreign Application Priority Data

Jul. 14, 2000 (JP) ........................................ 2000-214823

(51) Int. Cl.[7] .................................................. H02J 7/00
(52) U.S. Cl. .......................................... 307/66; 320/166
(58) Field of Search ............................. 307/66; 320/166

(56) References Cited

U.S. PATENT DOCUMENTS

| 4,056,764 | A | * | 11/1977 | Endo et al. .................. 320/101 |
| 5,246,552 | A | * | 9/1993 | Kamiya et al. .............. 205/701 |
| 5,591,212 | A | * | 1/1997 | Keimel .......................... 607/5 |
| 5,998,960 | A | | 12/1999 | Yamada et al. |
| 6,317,343 | B1 | * | 11/2001 | Okamura et al. ............. 363/59 |

FOREIGN PATENT DOCUMENTS

| JP | 5-122871 | 5/1993 |
| JP | 7-336915 | 12/1995 |
| JP | 2000-201435 | 7/2000 |
| WO | WO 98/28832 A1 | 7/1998 |

OTHER PUBLICATIONS

S. Nomoto et al., "Advanced Capacitors and their Application", Journal of Power Sources, vol. 97–98, Jul. 2001, pp. 807–811.
R. Kötz, et al., "Principles and Applications of Electrochemical Capacitors", Electrochemicia Acta, vol. 45 No. 15–16, May 2000, pp. 2483–2498.
Siemens Matsushita Components, "UltraCap Datasheet", Apr. 3, 1999, XP–002233312, Retrieved from the Internet.
A. Schneuwly, et al., "Properties and Applications of Supercapacitors From the State–of–the–Art to Future Trends", Proceedings PCIM 2000, Jun. 2000, XP–002233313, Retrieved from the Internet, pp. 1–10.
V Harri, "Superkapazitäten revolutionieren Energiespeicher", Superkondensatoren Bulletin SEV/VSE, Jan. 1999, XP–002233314, Retrieved from Internet, pp. 25–31.

* cited by examiner

Primary Examiner—Gregory J. Toatley, Jr.
(74) Attorney, Agent, or Firm—Foley & Lardner LLP (57) ABSTRACT A power control device includes an electric power storage device connected across a power supply line for a load and including at least one electric double layer capacitor (EDLC) bank and a secondary battery combined with the EDLC bank, the EDLC bank including a plurality of parallel-connected rows of EDLC unit cells, each of the rows including a plurality of series-connected EDLC unit cells, and a control device controlling the electric power storage device so that when an input power to the electric power storage device is interrupted, the EDLC bank supplies electric power to the load for an initial period of the power interrupt and subsequently, the secondary battery supplies electric power to the load.

19 Claims, 6 Drawing Sheets

| PERFORMANCE | EDLC BANK | LEAD-ACID STORAGE BATTERY | ALUMINUM SOLID ELECTROLYTIC CAPACITOR |
|---|---|---|---|
| ENERGY DENSITY | 0.2~10Wh/kg | 10~40Wh/kg | <0.1Wh/kg |
| OUTPUT DENSITY | 100W/kg~5000W/kg | 50W/kg~130W/kg | 10KW/kg~100KW/kg |
| CHARGING TIME | 0.1~100 MIN. | 1~10 HOURS | <1 MSEC. |
| DISCHARGING TIME | 0.1~100 MIN. | 0.3~3 HOURS | <1 MSEC. |
| CHARGING EFFICIENCY | >95% | 70%~85% | >95% |
| INTERNAL RESISTANCE | SEVERAL mΩ | SEVERAL TENS mΩ | ESR≒10~100 mΩ |
| CYCLE LIFE | >10000 | 200~1000 | >100000 |

POWER CONTROL DEVICE WITH ELECTRIC DOUBLE LAYER CAPACITOR UNIT CELLS

BACKGROUND OF THE INVENTION

1. Field of the Iinvention

This invention relates to a power control device controlling supply of electric power to a load by making use of electric power due to charge and discharge of an electric power storage device as well as electric power from a power supply.

2. Description of the Related Art

Power control devices of the above-described type include an electric power storage device so that a predetermined amount of electric power is supplied to a load even under occurrence of load variations and/or power supply variations. Electric energy stored in the power storage device is used for supply of power to the load. For example, an unterruptable power source comprises an AC/DC converter converting AC power to the corresponding DC power, a DC/AC inverter converting the DC power delivered from the converter to the corresponding AC power which is supplied to a load, and an electric power storage device connected between the converter and inverter. An AC input is converted by the AC/DC converter to the corresponding DC output under a normal condition. The DC output is converted by the inverter to an AC output having a desired current, voltage and frequency, the AC output being supplied to the load. The aforesaid DC output is partly used for charge to the power storage device, whereupon electric energy is stored in the power storage device. The electric energy stored in the power storage device is supplied to the load side upon occurrence of power failure. As a result, the load can be prevented from an interrupt.

The aforesaid power storage device comprises a secondary battery with a relatively long discharge duration, for example, a lead-acid battery, lithium ion battery or sodium ion battery (NaS battery). Alternatively, a multitude of aluminum solid electrolytic capacitors connected to one another are used as the power storage device. The above-described conventional power control device has the following problems. Firstly, each of the aforesaid power storage devices has a short cycle life and is accordingly handled as an expendable component. In the case of a lead-acid battery, for example, when the electric charge and discharge are alternately repeated at 200 to 1000 times under the use at normal depths of charge and discharge, deterioration of electrodes etc. results in a power reduction, whereupon the efficiency of the power control device is reduced. In view of the fact, the lead-acid battery needs to be replaced by a new one at the intervals of 2 or 3 years. Thus, the maintenance of power storage device necessitates much labor and large cost.

Secondly, the secondary batteries used as the power storage device contains materials detrimental to environment, for example, lead, acid, sulfur and lithium. Accordingly, sufficient maintenance is required in order that breakage of the power storage device may not result in environmental destruction. This disadvantageously increases the maintenance cost. Further, since the power storage device containing detrimental materials needs to be replaced by a new one at the intervals of 2 or 3 years, disposal of the power storage device requires a special treatment facility, resulting in high costs for treatment.

SUMMARY OF THE INVENTION

Therefore, an object of the present invention is to provide a power control device which has a high reliability, is easy to maintain and can reduce costs for environmental countermeasures.

The present invention provides a power control device comprising an electric power storage device provided across a power supply line for a load and including at least one electric double layer capacitor (EDLC) bank and a secondary battery combined with the EDLC bank, the EDLC bank including a plurality of parallel-connected rows of EDLC unit cells, each of the rows including a plurality of series-connected EDLC unit cells, and a control device controlling the electric power storage device so that when an input power to the electric power storage device is interrupted so as to result in a power interrupt, the EDLC bank supplies electric power to the load for an initial period of the power interrupt, and thereafter the secondary battery supplies electric power to the load.

Voltage and capacity both suitable for power control can be obtained since the electric double layer capacitor (EDLC) bank includes a plurality of EDLC unit cells configured into a series-parallel connection. Electric power is stored in the EDLC bank when a power supply has a sufficient amount of power to be supplied. The power stored in the EDLC bank is consumed when an amount of power consumed by the load exceeds a power-supplying capacity of the bank due to power stoppage, power supply variations or load variations. Consequently, a stable amount of electric power can be supplied to the load.

The EDLC bank can perform high-speed electric charge and discharge and accordingly has a high charging efficiency. As a result, power to be regenerated in a short time can efficiently be recovered by the EDLC bank and accordingly, the efficiency of the power control device can be improved. Furthermore, since the EDLC bank has a high output density, a large power can be supplied and received between the power supply and the load within a short time. Consequently, a stable high-quality power can be supplied to the load. Additionally, the EDLC bank contains no material contaminating environment, and a cycle life of the EDLC bank is as long as or longer than a service life of the power control device. Thus, since the EDLC bank need not be used as an expendable component and replaced by a new one, the maintenance of the power control device can be simplified and costs for measures to protect environment can be reduced.

Furthermore, the electric power storage device includes at least one EDLC bank and a secondary battery combined with the EDLC bank. Consequently, a high energy density of the secondary battery can be obtained as well as the high-speed charging and discharging performances, high charging efficiency and high output density of the EDLC bank. For example, a regenerative power obtained from the load in a short time is stored in the EDLC bank, whereas a regenerative power gradually obtained from the load in a long time is stored in the secondary battery. Further, provision of the secondary battery can realize power backup for a long time. Accordingly, supply of power to the load can be rendered possible for a long time even in power stoppage.

Still further, the electric power storage device includes at least one EDLC bank and an aluminum solid electrolytic capacitor combined with the EDLC bank. An aluminum solid electrolytic capacitor can absorb switching ripple current from the converter and the inverter. Further, a power variation in which frequency twice as high as that of a fundamental wave occurs at the DC side in an arrangement of compensating unbalance in a power system to which the inverter is connected or of converting the DC power from the electric power storage device to an AC power which is supplied to an unbalanced load. The aluminum solid electrolytic capacitor can also absorb the aforesaid power variation.

By making use of power stored in the aluminum solid electrolytic capacitor, a desired power can be supplied to the load in a very short period (several tens msec. or less) at an initial stage of sudden power supply variations such as power stoppage. In a subsequent period, power stored in the EDLC bank is supplied to the load. Thus, a stable power can be supplied to the load for a long period of time immediately after the sudden power supply variations such as power stoppage.

Yet still further, the electric power storage device includes at least one EDLC bank, an aluminum solid electrolytic capacitor and a secondary battery, the latter two of which are combined with the EDLC bank. Consequently, the above-described effects can be achieved simultaneously.

Furthermore, each EDLC unit cell has an internal resistance which is at or below 2 m$\Omega$ and a product of an electrostatic capacity of each EDLC unit cell by the internal resistance thereof is at or below 4 $\Omega$F. The arrangement is suitable for a case where variations at intervals of several hours or less in the load or power supply is leveled by energy stored in the EDLC. For example, electric power is supplied to a load varying at an interval shorter than several hours so that the load is leveled, whereupon influences on the power system can be rendered smaller. In this usage in which the power supply variations are compensated, power input to and output from the EDLC bank are frequent. As a result, loss of power due to an internal resistance tends to be increased. In accordance with the fourth preferred form, however, the internal resistance of each EDLC unit cell is set at a small value. Further, the internal resistance of each cell also depends upon the electrostatic capacity thereof. Accordingly, the product of the electrostatic capacity by the internal resistance serves as a value evaluating the internal resistance in the relationship with the electrostatic capacity and is set at a small value. Consequently, power loss can be reduced in the EDLC bank and the efficiency can be improved.

Yet still further, when the EDLC bank is used for a primary purpose of electric power storage, each EDLC unit cell has an internal resistance which is at or below 10 m$\Omega$ and a product of an electrostatic capacity of each EDLC unit cell by the internal resistance thereof is at or below 100 $\Omega$F. This arrangement is suitable for an uninterruptable power control unit which has a primary purpose of electric power storage while storing power for a relatively long time. More specifically, the arrangement is suitable for power control at intervals longer than several hours and equal to or shorter than several days. For example, electric power is supplied to a load varying at an interval of several days by the above-described arrangement so that the load is leveled, whereupon the power system can be operated efficiently.

Power loss due to the internal resistance of the EDLC bank is easy to reduce since the frequency of power input and output to and from the EDLC bank is low in the aforesaid power control. Accordingly, the internal resistance and the product of the electrostatic capacity by the internal resistance can be set at respective larger values as compared with a case where power control is performed under a load or power supply varying at intervals of several hours or less. Consequently, the internal resistance of each EDLC unit cell is increased such that the electrostatic capacity can be increased, and accordingly, a larger capacity of electric power can be stored.

Furthermore, a condition expressed by $Y>100\times X^{-0.8}$ is met where Y designates an energy density of each EDLC unit cell in Wh/kg and X designates an output density of each EDLC unit cell in W/kg. The inventors inspected the Ragone plot indicative of the relationship between energy density (Wh/kg) and output density (W/kg). The inventors then found the above-described condition from the results of the inspection. When the used EDLC unit cells meet the condition, the efficiency and performance in the power control by the EDLC bank can be rendered maximum.

Yet further, the electric power storage device includes at least one secondary battery having an energy density which is at or above 10 Wh/kg. This arrangement accomplishes an electric power storage device with a high energy density which cannot be achieved by the EDLC bank alone. Consequently, since an amount of energy stored is increased, electric power can be supplied to the load for a longer time.

Still yet further, the electric power storage device includes at least one aluminum solid electrolytic capacitor having an output density which is at or above 10,000 W/kg. This arrangement accomplishes an electric power storage device with a high output density which cannot be achieved by the EDLC bank alone. Consequently, the arrangement is suitable for a case where input and output of a large power are each performed in a short period of time.

BRIEF DESCRIPTION OF THE DRAWINGS

Other objects, features and advantages of the present invention will become clear upon reviewing of the following description of preferred embodiments, made with reference to the accompanying drawings, in which.

DETAILED DESCRIPTION OF PREFERRED EMBODIMENTS

Figure 1:
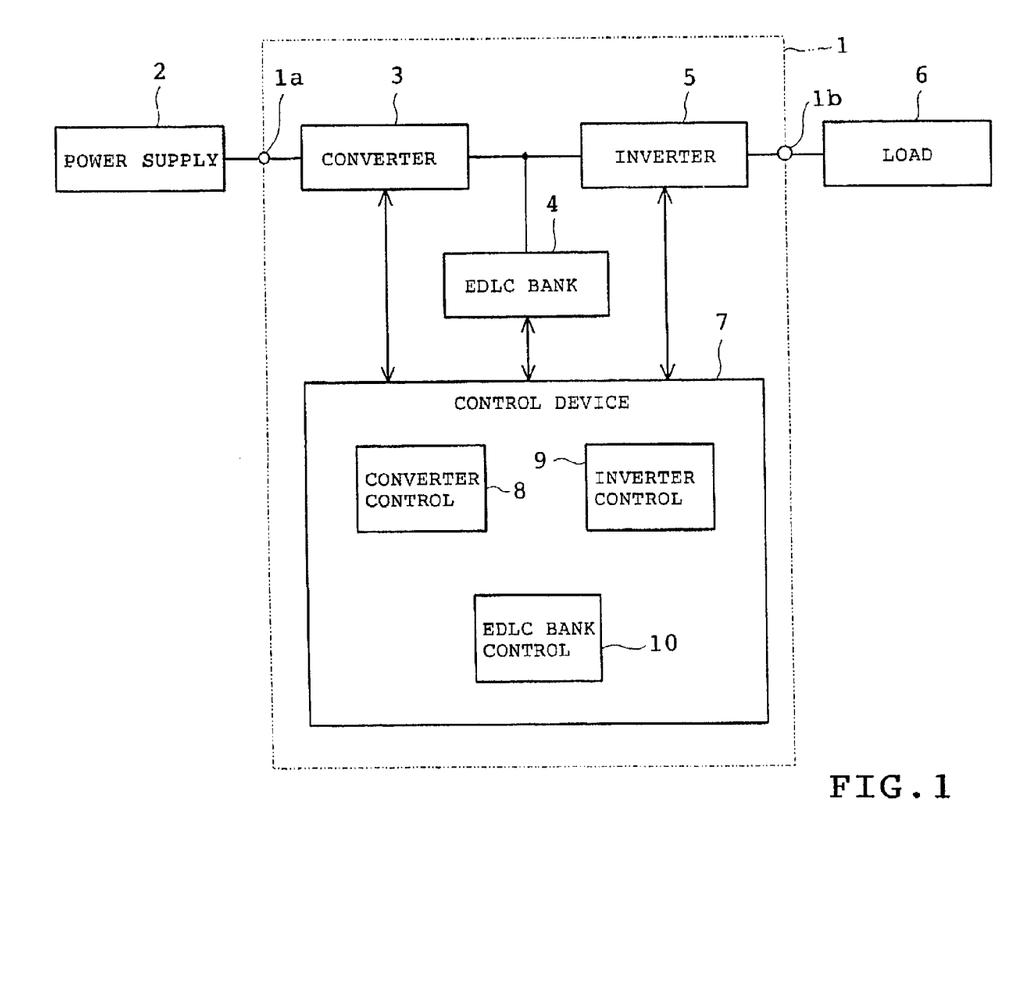
FIG. 1 is a schematic block diagram showing an electrical arrangement of a power control unit of a first embodiment in accordance with the present invention.

A first embodiment of the invention will be described with reference to FIGS. 1 to 5. Referring to FIG. 1, a power control unit 1 of the first embodiment is shown. A power supply 2 such as a commercial AC power supply is connected via an input terminal 1a of the power control device 1 to an AC input terminal of a converter 3 comprising bridge-connected switching elements such as IGBTs (insulated gate bipolar transistors). The converter 3 converts an AC power supplied to the AC input terminal thereof to a corresponding DC power which is delivered from a DC output terminal thereof. The DC output terminal of the converter 3 is connected both to a charge and discharge terminal 4a (see FIG. 4) of an electric double layer capacitor (EDLC) bank 4 and to a DC input terminal of an inverter 5. The inverter 5 also comprises bridge-connected switching elements such as IGBTs. The inverter 5 has an AC output terminal connected via an output terminal 1b of the power control device 1 to a load 6. The inverter 5 supplies to the load 6 electric power with set voltage, current, frequency and phase.

A control device 7 mainly includes a converter control 8, inverter control 9, EDLC bank control 10. The converter control 8 controls the converter 3 and the inverter control 9 controls the inverter 5. The EDLC bank control 10 controls charging and discharging operations of the EDLC bank 4. The control device 7 monitors the controlling operations of the controls 8 to 10 respectively to perform a power control so that a predetermined power is supplied to the load 6.

Figure 2:
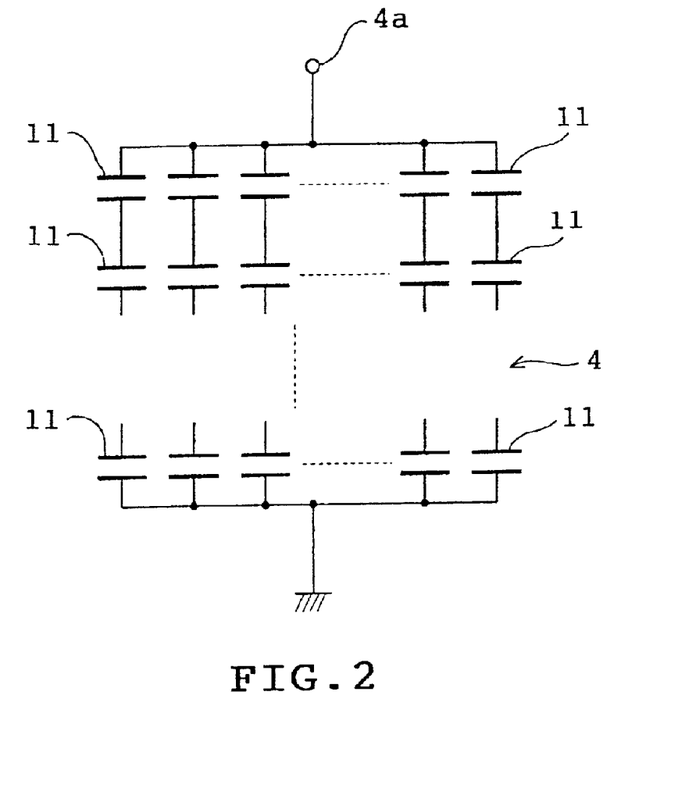
FIG. 2 illustrates an arrangement of EDLC units constituting an EDLC bank used in the power control unit.

Referring now to FIG. 2, an electrical arrangement of the EDLC bank 4 serving as an electric power storage device is shown. The EDLC bank 4 includes a plurality of parallel-connected rows of EDLC units 11, each of which rows includes a plurality of series-connected EDLC units 11. One end of a circuit composed of the EDLC units 11 connected as described-above is connected to the charge and discharge terminal 4a, whereas the other end of the circuit is grounded. Bank changing means (not shown) is provided for changing between series and parallel connection of the EDLC bank 4 at the command of the EDLC bank control 10 so that a charged and discharged state of the EDLC bank 4, a charging current and a discharging current are controlled.

Figure 3:
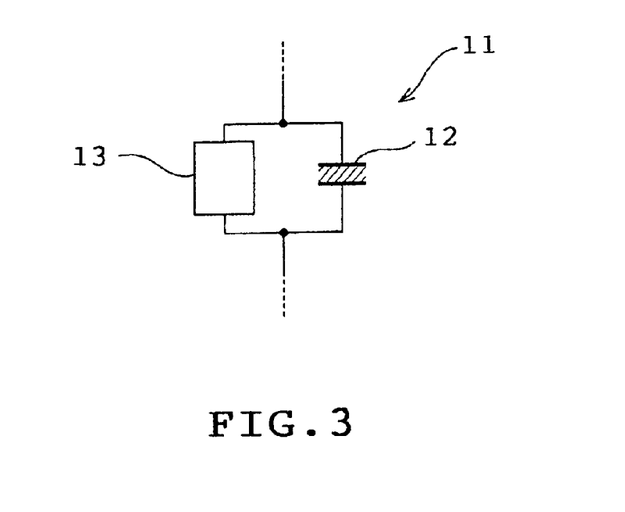
FIG. 3 schematically illustrates an electrical arrangement of the EDLC unit.

Each EDLC unit 11 includes an EDLC unit cell 12 and a voltage balancer 13 connected in parallel to the EDLC unit cell. The voltage balancer 13 comprises Zener diodes, diodes, resistors, capacitors, comparators and transistors none of which are shown. The voltage balancer 13 controls a voltage across terminals of the EDLC unit cell 12 so that the voltage is in or below a range between 2.0 and 3.0 V, for example. In the embodiment, the voltage is set at 2.7 V. The voltage balancer 13 further prevents the reverse-polarity charging and protects the EDLC unit cell 12 from being broken by a steep current. Additionally, the voltage balancer 13 short-circuits the EDLC unit cell 12 when the cell has failed. Thus, the EDLC unit cell 12 performs the charging and discharging operations properly efficiently for a long period of time as the result of provision of the voltage balancer 13. The number of series-connected EDLC units 11 is set to be slightly larger than an actually required number.

The operation of the power control unit will be described. The control device 7 is previously set with values of voltage, current, frequency and phase. Firstly, the control device 7 supplies a control signal to the converter control 8 so that the converter 3 is driven. As a result, the converter control 8 drives the converter 3 so that an AC power supplied from the power supply 2 via the input terminal 1a is converted to a corresponding DC power. The DC power is supplied to the EDLC bank 4 and the inverter 5. An amount of energy stored in the EDLC bank 4 is zero in an initial state thereof. Accordingly, the EDLC bank 4 is charged with the supplied DC power. On the other hand, the control device 7 supplies to the inverter control 9 set values of voltage, current, frequency and phase. In a normal or powering operation, the inverter 5 converts the supplied DC power to a corresponding AC power on the basis of the aforesaid set values, thereby delivering the resultant AC power to the load 6. In a regenerative operation, the inverter 5 supplies electric power from the load 6 to the EDLC bank 4, and the converter 3 supplies electric power from the power supply 2 to the EDLC bank 4.

The EDLC bank 4 is charged with the DC output from the converter 3 under the control of the control device 7 when discharging is not required. Each of the EDLC unit cells 12 composing the EDLC bank 4 is charged and discharged at high speeds. When determining that power supplied to the load 6 becomes insufficient due to a decrease in the voltage, frequency or the like in the power supply 2, the control device 7 supplies the DC power at the EDLC bank 4 via the inverter 5 and the output terminal 1b to the load 6.

Figure 4:
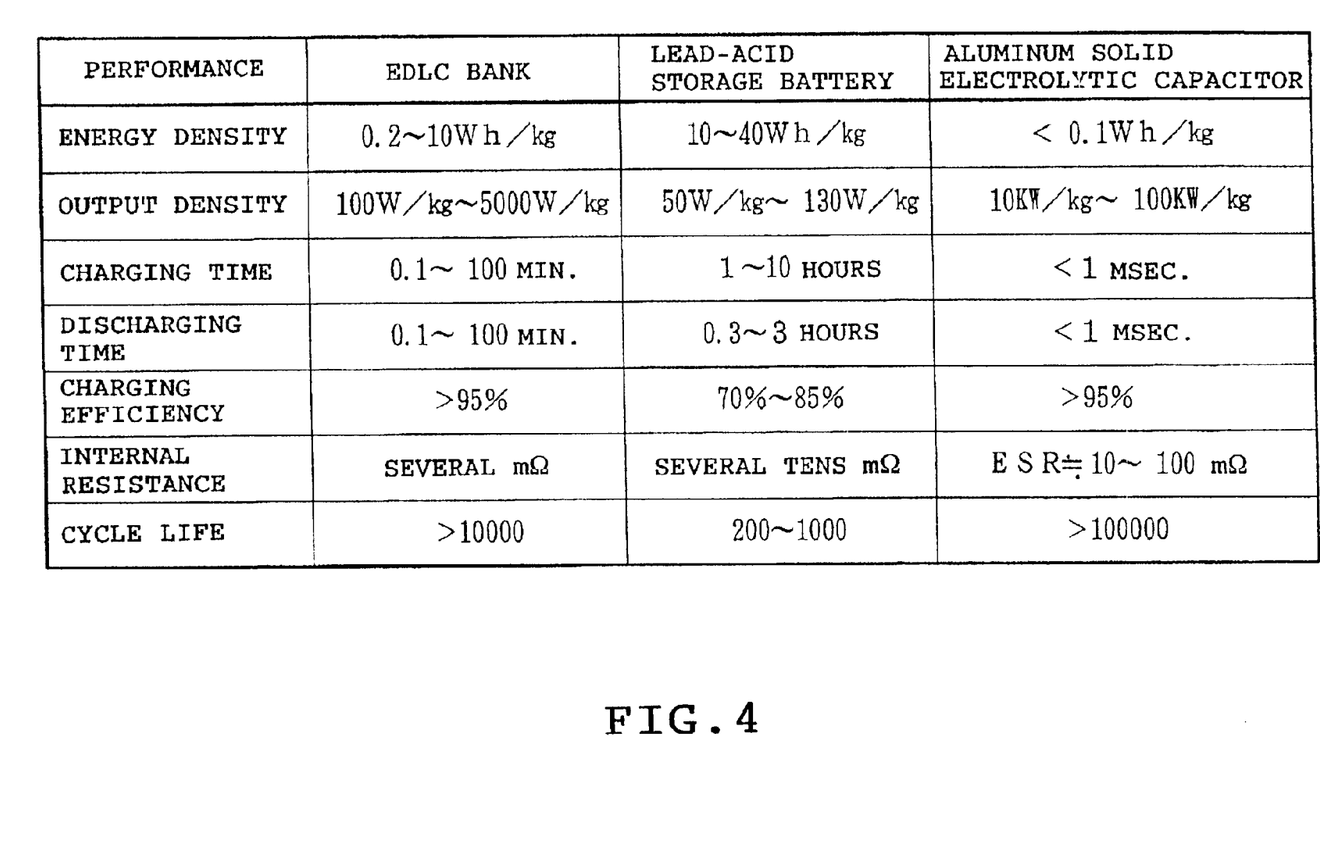
FIG. 4 illustrates performances of electric power storage devices.

Performances of the power control device 1 comprising the EDLC bank 4 will now be described. FIG. 4 shows performances of a lead-acid battery, an aluminum solid electrolytic capacitor and the EDLC unit cell 12. The power control unit using the EDLC bank 4 has a lower internal resistance and longer cycle life than one using the lead-acid battery. Consequently, the electric power can be supplied into and delivered from the EDLC bank 4 at high speeds with high efficiency. Further, since the EDLC bank 4 contains no material or substance contaminating environment, costs for environmental protection can be reduced The following describes the relationship between variations in the load 6 or power supply 2 and characteristics of the EDLC bank 4. When the power supply 2 or load 6 varies, the EDLC bank 4 performs charging and discharging at a frequency according to a varying speed. The charging and discharging operations accompany power loss due to an internal resistance. In view of this problem, conditions of each EDLC unit cell 12 are set on the basis of criteria which will be described as follows:

(1) A case where the load 6 varies at intervals of several hours or less:

When the power control is performed so that the load is leveled, power is frequently supplied to and delivered from each EDLC unit cell 12, whereupon power loss due to the internal resistance R of each EDLC unit cell 12 tends to be increased. Accordingly, it is preferable that the internal resistance R and a product of an electrostatic capacity C by the internal resistance R should be rendered as small as possible. The reason for the use of the aforesaid product is as follows: Dimensions of each EDLC unit cell 12 are increased with the increase in the electrostatic capacity C and accordingly, the internal resistance of the cell takes various values depending upon the dimensions of the cell. Thus, a criterion of evaluation cannot be determined only by the internal resistance, and it is difficult to reduce the resistance loss of the EDLC bank 4 while the internal resistance is balanced with an amount of charged electric energy.

In each EDLC unit cell 12 incorporated in the EDLC bank 4 in the embodiment, the internal resistance R is at or below 2 mΩ and the product of the electrostatic capacity by the internal resistance R is at or below 4 ΩF. Consequently, the internal resistance of the overall EDLC bank 4 and accordingly the power loss can be reduced. For example, when each EDLC unit cell 12 has the rating of 2.5 V, 30 A, 2,000 F and the internal resistance of 1.5 mΩ, an amount of electric energy E charged therein is obtained as:

$$E = CV^2/2 = 2000 \times (2.5)^2/(2 \times 3600)$$
$$= \text{about } 1.74 \text{ (Wh)}.$$

Further, output power P (W) of each EDLC unit cell 12 is obtained as:

$$P = VI = 2.5 \times 30 = 75 \ (W).$$

Power loss Pr per unit cell 12 in this case is shown as:

$$Pr = I^2 R = 30^2 \times 0.0015 = 1.35 \ (W).$$

Accordingly, a ratio L of the power loss Pr to the output power P is shown by:

$$L = 1.35/75 = 1.8 \ (\%).$$

Consequently, a preferable ratio L in the actual use can be achieved. Further, the product of the electrostatic capacity C by the internal resistance R becomes 3 ΩF, which value meets the aforesaid requirement. As a result, a predetermined amount of electric energy stored can be ensured, and the load 6 is leveled with small power loss, whereupon influences of the load variations upon the power system can be reduced.

(2) A case where the load 6 varies at an interval ranging between several hours and several days:

Power loss due to the internal resistance is relatively small since the frequency of input and output of electric power to and from the EDLC bank 4 is low in this case. Accordingly, each EDLC unit cell 12 in case (2) may have a larger internal resistance than each EDLC unit cell 12 in case (1). The electrostatic capacity C can be increased with the increase in the internal resistance R of each EDLC unit cell. As a result, the EDLC bank 4 can store a larger electric power.

In each of the EDLC unit cells 12 incorporated in the EDLC bank 4 in the embodiment, the internal resistance is at or below 10 mΩ and the product of the electrostatic capacity by the internal resistance is at or below 100 ΩF. For example, when each EDLC unit cell 12 has the rating of 2.5 V, 10 A, 20,000 F, an amount of electric energy E stored therein is obtained as:

$$E = CV^2/2 = 20000 \times (2.5)^2/(2 \times 3600)$$
$$= \text{about } 17.4 \text{ (Wh)}.$$

The capacity of the EDLC bank is thus increased and the load 6 is leveled under optimum conditions by previously estimating the variation interval of the load 6. Consequently, influences of the load variations upon the power system can be reduced.

Figure 5:
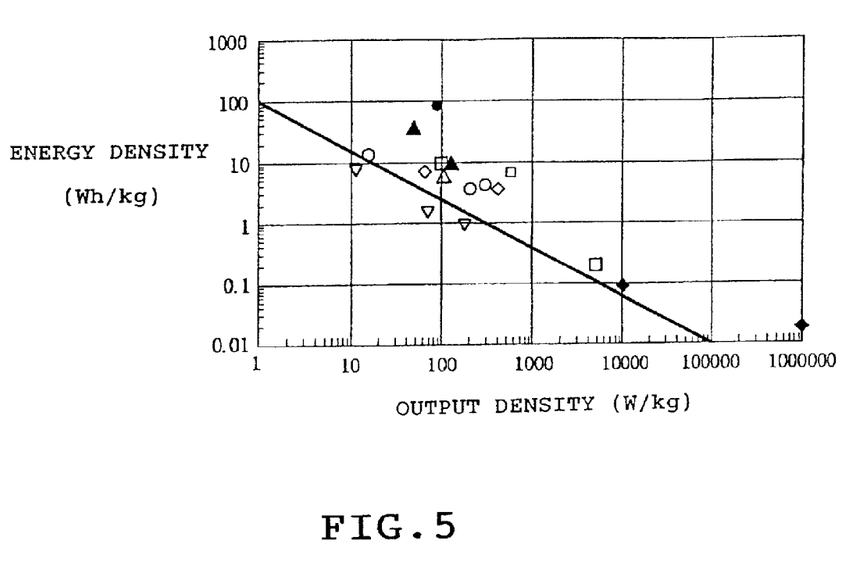
FIG. 5 shows a Ragone Plot of an EDLC unit cell.

FIG. 5 shows a Ragone plot which is well known in the technical field of electric double layer capacitors. The plot shows the relationship between an output density (W/kg) and an energy density (Wh/kg) per weight of the EDLC unit cell 12. Symbols "●" and "▼" denote characteristics of a secondary storage battery such as a lead-acid battery. Symbol "◆" denotes the characteristic of an aluminum solid electrolytic capacitor. Symbols "○," "△," "□" and "◇" denote the characteristics of the EDLC unit cell 12. Straight line in FIG. 5 denotes the following relationship between the energy density Y and the output density X:

$$Y = 100 \times X^{-0.8}. \quad (1)$$

The straight line overlapping the Ragone plot is suggested by the inventors and defines a selection criteria for the EDLC unit cell 12 suitable for use with the power control device 1. More specifically, an EDLC unit cell 12 meeting the requirement of the following expression (2) is suitable for the use with the power control device 1:

$$Y > 100 \times X^{-0.8}. \quad (2)$$

On the contrary, when the aforesaid condition is not met, the power control device 1 is insufficient in the performances including the efficiency, input and output speeds of power, and stored energy. Consequently, the power control device cannot practically be used.

According to the above-described embodiment, the power storage device includes the EDLC bank 4 comprising the EDLC unit cells 12 in each of which the electric double layer capacitor is used. The EDLC unit cell 12 has a cycle life equal to or longer than a service life of the power control device 1. As a result, the EDLC bank 4 need not be replaced by a new one and accordingly, the maintenance of the power control device can be rendered easier. Further, the costs for the environmental protection can be reduced since the EDLC unit cell 12 contains no material or substance detrimental to environment.

Furthermore, the characteristics of each EDLC unit cell 12 are set according to the estimated intervals of the power or load variations, whereupon either the speed or the capacity is respectable in the EDLC bank 4. Consequently, the load 6 can efficiently be leveled and stabilized.

The EDLC bank 4 can perform high-speed charge and discharge and accordingly has a high charging efficiency. As a result, power to be regenerated in a short time can efficiently be recovered by the EDLC bank and accordingly, the efficiency of the power control device 1 can be improved. Furthermore, since the EDLC bank has a high output density, a large difference between the power supplied by the power supply 2 and consumed power can be absorbed in a short period of time. Consequently, a stable high-quality power can be supplied to the load 6.

Figure 6:
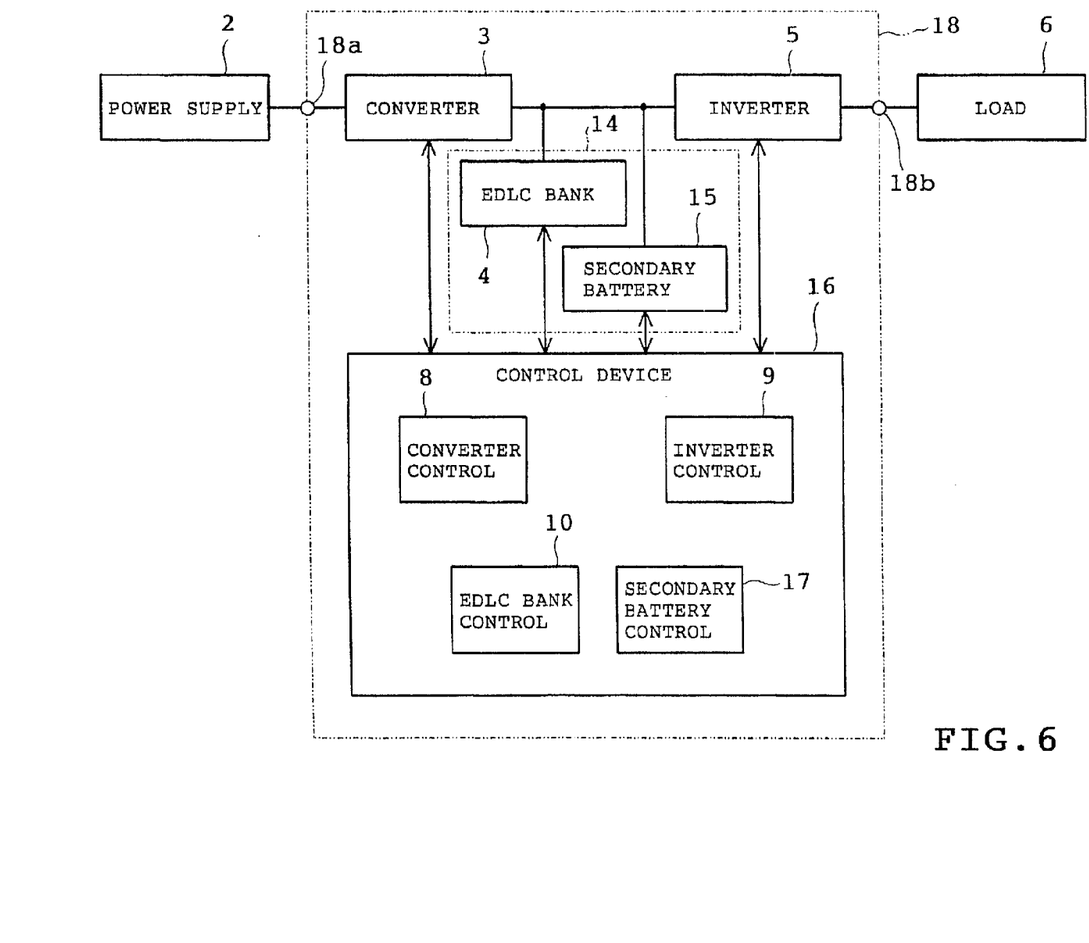
FIG. 6 is a view similar to FIG. 1, showing a second embodiment in accordance with the invention.

FIG. 6 illustrates a second embodiment of the invention. The similar or identical parts in the second embodiment are labeled by the same reference symbols as in the first embodiment. The description of these parts are eliminated and only the difference between the first and second embodiments will be described. Referring to FIG. 6, the power storage device 14 provided in the power control device 18 includes the EDLC bank 4 and a secondary battery 15 connected in parallel with the bank. The power control device 18 has the input terminal 18a to which the power supply 2 is connected and the output terminal 18b to which the load 6 is connected. The secondary battery 15 comprises a lead-acid battery having the performance as shown in FIG. 4. The control device 16 includes a secondary battery control 17 controlling the secondary battery 15. The secondary battery control 17 normally monitors a charged state of the secondary battery 15, supplying a signal indicative of the charged state. The control 17 further controls charging and discharging operations of the secondary battery 15.

According to the second embodiment, when the electric discharge is unnecessary, the electric power from the power supply 2 is supplied via the input terminal 18a and the converter 3 to the EDLC bank 4 and secondary battery 15, whereby the EDLC bank 4 and secondary battery 15 are charged with the electric power. When detecting a decrease in the electric power due to power stoppage, the control device 16 delivers a command to the EDLC bank control 10 so that the EDLC bank 4 supplies electric power to the load 4 for an initial short period of the power stoppage (for 1 minute, for example). Thereafter, the control device 16 delivers a command to the secondary battery control 17 so that the secondary battery 15 supplies electric power to the load 6.

The secondary battery 15 generally has a higher energy density than the EDLC bank 4 as obvious from FIG. 4. Accordingly, an amount of energy stored in the storage battery 14 can be rendered larger than in the first embodiment. In this case, the secondary battery 15 should have an energy density which is at or above 10 Wh/kg and meets the condition of expression (2). Such a large energy density cannot be achieved from the EDLC bank 4. Thus, an amount of stored energy can be increased, and a long time of backup can become possible. Further, the power control performance can be increased. Additionally, when a variation interval of the load 6 is previously determined and the EDLC bank 4 is used under an appropriate condition, the load 6 is leveled and influences of the load variations upon the electric power system can be reduced.

Figure 7:
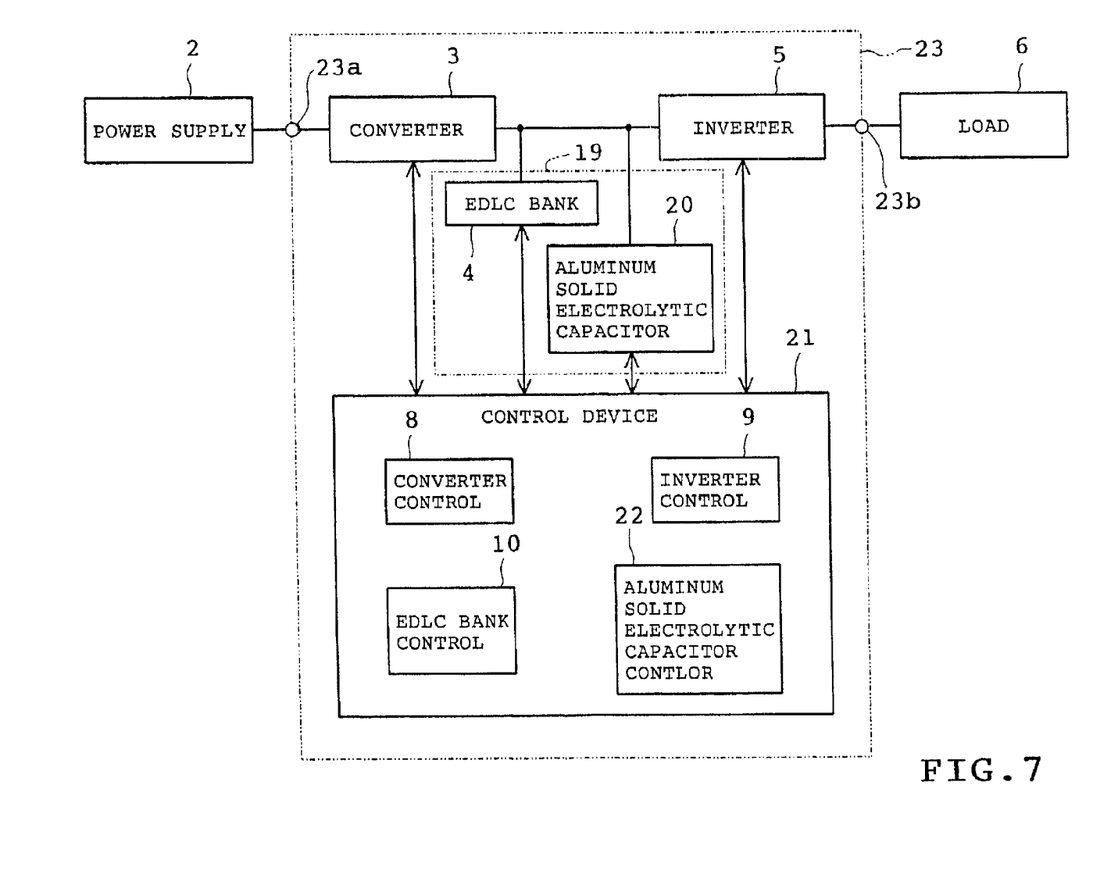
FIG. 7 is a view similar to FIG. 1, showing a third embodiment in accordance with the invention.

FIG. 7 illustrates a third embodiment of the invention. The power storage device 19 provided in the power control device 23 includes the EDLC bank 4 and a plurality of aluminum solid electrolytic capacitors 20 connected in parallel with the bank. The power control device 23 has the input terminal 23a to which the power supply 2 is connected and the output terminal 23b to which the load 6 is connected. The control device 21 includes an aluminum solid electrolytic capacitor control 22 controlling a parallel circuit of the aluminum solid electrolytic capacitors 20. The control 22 normally monitors a charged state of the secondary batteries 15, thereby delivering a signal to the charged state. The control 22 further controls charging and discharging operations of the secondary batteries 15.

According to the third embodiment, when the electric discharge is unnecessary, the electric power from the power supply 2 is supplied via the input terminal 23a and the converter 3 to the EDLC bank 4 and aluminum solid electrolytic capacitor 20, whereby the EDLC bank 4 and secondary batteries 15 are charged with the electric power. When detecting a decrease in the electric power due to power stoppage, the control device 21 delivers a command to the control 22 so that the control 22 supplies electric power to the load 4 for an initial short period of the power stoppage (for several tens minutes, for example). Thereafter, the control device 16 delivers a command to the secondary battery control 17 so that the control 10 supplies electric power from the EDLC bank 4 to the load 6. Consequently, a higher speed input and output of electric power can be realized, and a stable electric power can be supplied to the load even immediately after power stoppage.

The aluminum solid electrolytic capacitor 20 has a function of absorbing a switching ripple current produced by switching elements of the converter 3 or inverter 5. Further, when a three-phase unbalanced load or single-phase load is connected to the inverter 5, a power variation in which frequency twice as high as that of a fundamental wave occurs at the DC side in an arrangement of compensating unbalance in a power system to which the inverter is connected or of converting the DC power from the storage battery to an AC power which is supplied to an unbalanced load. The aluminum solid electrolytic capacitor 20 can absorb this power variation. In this case, the used aluminum solid electrolytic capacitor 20 should preferably have an energy density which is at or above 10,000 W/kg and meet the condition of expression (2). Such a large energy density cannot be achieved from the EDLC bank 4. Consequently, a large electric power that cannot be obtained only from the EDLC bank 4 can be supplied. Additionally, when a variation interval of the load 6 is previously determined and the EDLC bank 4 is used under an appropriate condition, the load 6 is leveled and influences of the load variations upon the electric power system can be reduced.

In a modified form, both the secondary battery 15 and the aluminum solid electrolytic capacitor 20 may be combined with the EDLC bank 4 together. Consequently, the effects achieved from the second and third embodiments can be obtained simultaneously. For example, a stable electric power can be supplied to the load for a long period of time even immediately after power stoppage.

Although the lead-acid battery is used as the secondary battery 15 in the second embodiment, a lithium ion battery or sodium-sulfur battery (NaS battery) may be used as the secondary battery, instead of the lead-acid battery.

In the foregoing embodiments, the bank switching means is provided as the control means for controlling the charged and discharged state of the EDLC bank 4 and a charging and discharging current. For example, a current setting resistor may be connected in series to the EDLC bank 4 so that the EDLC bank control 10 delivers a command to change a resistance value thereof. Alternatively, a chopper circuit may be provided in the EDLC bank 4 so that the control 4 delivers a signal to control the switching operation of the chopper circuit.

Each of the above-described power control devices may be applied to electric cars, UPS and actuators.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A power control device comprising:

an electric power storage device provided across a power supply line for a load and including at least one electric double layer capacitor (EDLC) bank and a secondary battery combined with the EDLC bank, said EDLC bank including a plurality of parallel-connected rows of EDLC unit cells, each of the rows including a plurality of series-connected EDLC unit cells; and a control device controlling the electric power storage device so that when an input power to the electric power storage device is interrupted so as to result in a power interrupt, the EDLC bank supplies electric power to the load for an initial period of the power interrupt, and thereafter the secondary battery supplies electric power to the load.

2. A power control device comprising:

an electric power storage device provided across a power supply line for a load and including at least one electric double layer capacitor (EDLC) bank and an aluminum solid electrolytic capacitor combined with the EDLC bank, said EDLC bank including a plurality of parallel-connected rows of EDLC unit cells, each of the rows including a plurality of series-connected EDLC unit cells; and a control device controlling the electric power storage device so that when an input power to the electric power storage device is interrupted so as to result in a power interrupt, the aluminum solid electrolytic capacitor supplies electric power to the load for an initial period of the power interrupt, and thereafter the EDLC bank supplies electric power to the load.

3. A power control device comprising:

an electric power storage device provided across a power supply line for a load and including at least one electric double layer capacitor (EDLC) bank, a secondary battery combined with the EDLC bank and an aluminum solid electrolytic capacitor combined with the EDLC bank, said EDLC bank including a plurality of parallel-connected rows of EDLC unit cells, each of the rows including a plurality of series-connected EDLC unit cells; and a control device controlling the electric power storage device so that when an input power to the electric power storage device is interrupted so as to result in a power interrupt, the aluminum solid electrolytic capacitor supplies electric power to the load for a first initial period of the power interrupt and the EDLC bank supplies electric power to the load for a second initial short period of the power interrupt that occurs immediately after the first initial short period of time, and thereafter the secondary battery supplies electric power to the load.

4. A power control device according to claim 1, wherein each EDLC unit cell has an internal resistance which is at or below 2 mΩ and a product of an electrostatic capacity of each EDLC unit cell by the internal resistance thereof is at or below 4 ΩF.

5. A power control device according to claim 2, wherein each EDLC unit cell has an internal resistance which is at or below 2 mΩ and a product of an electrostatic capacity of each EDLC unit cell by the internal resistance thereof is at or below 4 ΩF.

6. A power control device according to claim 3, wherein each EDLC unit cell has an internal resistance which is at or below 2 mΩ and a product of an electrostatic capacity of each EDLC unit cell by the internal resistance thereof is at or below 4 ΩF.

7. A power control device according to claim 1, wherein when the EDLC bank is used for a primary purpose of electric power storage, each EDLC unit cell has an internal resistance which is at or below 10 mΩ and a product of an electrostatic capacity of each EDLC unit cell by the internal resistance thereof is at or below 100 ΩF.

8. A power control device according to claim 2, wherein when the EDLC bank is used for a primary purpose of electric power storage, each EDLC unit cell has an internal resistance which is at or below 10 mΩ and a product of an electrostatic capacity of each EDLC unit cell by the internal resistance thereof is at or below 100 ΩF.

9. A power control device according to claim 3, wherein when the EDLC bank is used for a primary purpose of electric power storage, each EDLC unit cell has an internal resistance which is at or below 10 mΩ and a product of an electrostatic capacity of each EDLC unit cell by the internal resistance thereof is at or below 100 ΩF.

10. A power control device according to claim 1, wherein a condition expressed by $Y>100 \times X^{-0.8}$ is met where Y designates an energy density of each EDLC unit cell in Wh/kg and X designates an output density of each EDLC unit cell in W/kg.

11. A power control device according to claim 2, wherein a condition expressed by $Y>100 \times X^{-0.8}$ is met where Y designates an energy density of each EDLC unit cell in Wh/kg and X designates an output density of each EDLC unit cell in W/kg.

12. A power control device according to claim 3, wherein a condition expressed by $Y>100 \times X^{-0.8}$ is met where Y designates an energy density of each EDLC unit cell in Wh/kg and X designates an output density of each EDLC unit cell in W/kg.

13. A power control device according to claim 1, wherein the electric power storage device includes at least one secondary battery having an energy density which is at or above 10 Wh/kg.

14. A power control device according to claim 3, wherein the electric power storage device includes at least one secondary battery having an energy density which is at or above 10 Wh/kg.

15. A power control device according to claim 2, wherein the electric power storage device includes at least one aluminum solid electrolytic capacitor having an output density which is at or above 10,000 W/kg.

16. A power control device according to claim 3, wherein the electric power storage device includes at least one aluminum solid electrolytic capacitor having an output density which is at or above 10,000 W/kg.

17. A power control device according to claim 1, wherein the secondary battery has a higher energy density that the EDLC bank.

18. A power control device according to claim 2, further comprising:

an AC/DC converter for receiving AC power from the power supply line and for outputting DC power; and a DC/AC inverter for receiving the DC power output from the AC/DC converter and for outputting AC power to the load, wherein the aluminum solid electrolytic capacitor includes means for absorbing a ripple current produced by switching elements of the AC/DC converter and the DC/AC inverter.

19. A power control device according to claim 3, further comprising:

a current setting resistor connected in series to the EDLC bank, wherein the control device outputs a command to the current setting resistor to change a resistance value thereof, so as to control a charge and discharge state of the EDLC bank.

* * * * *